(12) United States Patent
Dow et al.

(10) Patent No.: US 7,361,427 B1
(45) Date of Patent: Apr. 22, 2008

(54) MANIFOLD FOR A PILE CONFIGURED BATTERY

(75) Inventors: Eric G. Dow, Barrington, RI (US);
Gary Bolstridge, Portsmouth, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 494 days.

(21) Appl. No.: 11/138,592

(22) Filed: May 27, 2005

(51) Int. Cl.
*H01M 2/38* (2006.01)
*H01M 2/12* (2006.01)
*H01M 4/36* (2006.01)
(52) U.S. Cl. .................. 429/51; 429/71; 429/81; 429/105
(58) Field of Classification Search .................. 429/51, 429/81, 71, 105
See application file for complete search history.

(56) References Cited

U.S. PATENT DOCUMENTS

| 4,324,844 | A | | 4/1982 | Kothmann |
| 4,444,851 | A | | 4/1984 | Maru |
| 4,461,817 | A | * | 7/1984 | Itoh et al. ............... 429/209 |
| 4,578,324 | A | | 3/1986 | Koehler et al. |
| 4,706,737 | A | | 11/1987 | Taylor et al. |
| 4,732,823 | A | * | 3/1988 | Ito et al. ................ 429/72 |
| 4,735,871 | A | | 4/1988 | Descroix et al. |
| 5,093,213 | A | | 3/1992 | O'Callaghan |
| 5,188,911 | A | * | 2/1993 | Downing et al. ......... 429/70 |
| 5,230,966 | A | | 7/1993 | Voss et al. |

\* cited by examiner

*Primary Examiner*—Patrick Joseph Ryan
*Assistant Examiner*—Thomas H. Parsons
(74) *Attorney, Agent, or Firm*—James M. Kasischke; Michael P. Stanley; Jean-Paul A. Nasser

(57) ABSTRACT

An improved method of fabricating and discharging a pile configured battery which utilizes an electrically conductive flowing aqueous electrolyte. This is accomplished by use of a single piece hydraulic manifold plate which decouples the hydraulic performance parameters of the manifold from the electrical performance parameters. The manifold plate includes a configuration of hydraulic feed channels and distribution headers which separately account for electrical resistive effects and fluid viscous and dynamic pressure effects. Implementation of such manifold plates allow for improved energy conversion efficiency as well as utilization of multiple dissimilar fluids in a single battery cartridge cell discharge at greatly reduced complexity and cost.

10 Claims, 6 Drawing Sheets

MANIFOLD FOR A PILE CONFIGURED BATTERY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to batteries, more particularly to batteries that employ an electrically conductive flowing aqueous electrolyte, and most particularly to batteries that employ an electrically conductive flowing aqueous electrolyte in a stackable cell configuration.

2. Description of the Related Art

A pile configured battery cartridge consists of a group of electrochemical cells, two or more, comprised of flat plate electrodes mechanically stacked one on top of the other. The cell consists of a positive electrode, a negative electrode, and a cell gap separating the two into which a conductive electrolyte flows as required to allow conductive ionic species to transfer between the positive and negative cell electrodes while electrons, in the form of electrical current, flows from the cell via the positive cathode electrode and returns to the cell via the negative anode electrode.

By stacking two or more cells on top of each other, the anode of one cell adjacent to the cathode of the adjoining cell, and providing an electrical interface between adjacent cells, an electrical series connection of multiple single cells is achieved. Activation of the cells and the cell stack is achieved by introducing the appropriate electrolyte into each cell and providing an electrical connection between the anode and cathode on the opposite ends of the cell stack.

The electrochemical discharge reaction (reduction of the cathode and oxidation of the anode) occurring in each cell of the battery stack will continue as long as there are sufficient levels of chemical reactants, the physical integrity of the individual cell components is maintained, and the critical operating parameters, such as electrode temperature, are maintained at required levels. In many pile battery applications, such as an aluminum-silver oxide primary battery, the magnitude of electrical current conducted through the electrodes and electrolyte combined with the thermodynamic energy associated with the electrochemical and corrosion reactions, defined in Eqs 1 and 2, respectively,

$$2Al+3AgO+2NaOH2NaAlO2+3Ag+H2O \quad E'=2.88 \text{ v} \quad (1)$$

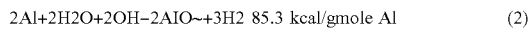

$$2Al+2H2O+2OH-2AlO\sim+3H2 \quad 85.3 \text{ kcal/gmole Al} \quad (2)$$

is such that the rate and magnitude of heat resulting from these effects raises the temperature of the cell electrodes and electrolyte. In order that the cell temperature does not exceed an allowable threshold, heat generated inside the cell by the reactions described in Eqs. 1 and 2 must be removed by some mechanism. The mechanism of choice is by forced or natural convection utilizing the electrolyte as the convective media. This is accomplished by flowing the relatively low temperature electrolyte at a prescribed rate into and through the cell, thus transferring the heat from the cell into the electrolyte and out of the cell, thus maintaining the cell at the desired temperature. In order to maintain a uniform temperature distribution across the surface of an individual cell electrode, a uniform Reynolds number, i.e., mass flow rate of electrolyte, must exist across the electrode. A non, uniform flow distribution through an individual cell results in non uniform heat transfer resulting in a temperature gradient across the cell electrodes. The magnitude of the temperature gradient is proportional to the imbalance of the flow distribution. The impact of the temperature gradient are realized in the form of non uniform electrochemical and corrosion reactions described in Eqs. 1 and 2 resulting in non uniform electrode consumption and reduced cell operating efficiency.

In conjunction with the requirement for uniform mass flow within the individual electrochemical cell, it is imperative to maintain a uniform mass flow distribution to each of the individual cells comprising the multiple cell stack. This is necessary to assure uniform temperature from cell to cell, thus avoiding a temperature gradient among the individual cells. This has the same effect as described for the individual cell, non uniform electrode consumption among cells, non uniform electrochemical conversion efficiency and non uniform generation of reaction products from cell to cell, all of these result in reduced overall cartridge operating efficiency.

There are generally two types of pile battery construction. The first employs a one-piece cast manifold assembly. This consists of a hydraulic header, with either a tapered cross sectional area in the axial direction or a constant cross sectional area in the axial direction, off of which are networks of parallel hydraulic branches, spaced either uniformly or non uniformly as required to achieve uniform flow distribution, in the axial direction, through these lateral branches. These lateral branches indirectly feed individual cells or groups of cells in a battery cartridge electrode stack. Feeding would mean to provide hydraulic fluid, in this case conductive electrolyte, into a hydraulic plenum or raceway to which each cell, or a group of cells, in the cell stack would be in contact, hydraulically and electrically.

The lateral branches and fluid exit ports of the one-piece cast manifold assembly, here to fore also referred to as the cast manifold, are not mechanically connected to the individual cells within the cell stack. All of the hydraulic exit ports exiting the manifold and feeding the cell stack are hydraulically and electrically in contact with all of the cells in the cell stack. This is a major problem which resulted in a hydraulic distribution problem closely coupled to an electrical circuit problem, each with diametrically opposed approaches to optimization. The hydraulic problem could not be addressed without having to address the electrical circuit problem and visa versa. This would not be an issue of concern if it was not for the fact that each of these problems are technically very complicated and, independent of each other, require a great deal of experimental and analytical study. The need to address just one of these problems automatically doubles the required level of effort.

A related problem with the cast manifold is that a manifold had to be custom fabricated for each specific cartridge containing a different number of cells. Any variation to the cartridge as a result of varying the number of cells the cartridge was to include required the design, fabrication and experimental evaluation of a new cast manifold assembly. This process could literally take years depending on the magnitude of the variations between cartridge sizes. It became readily apparent that in order to stay competitive it was necessary to design a manifold configuration that could be independent of the number of cells in a given cartridge configuration.

The inability to introduce multiple fluids, each one chemically unique, into each cell of the cartridge while maintaining the hydraulic separation of the fluids was not possible with a cast manifold assembly. In certain pile battery electrochemistry's, it is necessary to operate with separated flows, to do otherwise would render the electrochemistry so inefficient it could not be used. A method to accomplish this was needed.

As a result of the above referenced problems with a cast manifold assembly pile battery configuration, a one-piece injection molded manifold was developed. This manifold comprises a single manifold assembly for each cell, which contains all the hydraulic distribution network channels impressed into the assembly. This allowed for improved performance and cost reduction, but did not allow for separated flow via a single manifold nor did it allow for hydraulic sealing of adjacent manifolds independent of the compressive force applied to the manifold assembly. This manifold also did not decouple the hydraulic performance from the electrical performance of the manifold.

In order to address some of the limitations noted above, the invention disclosed in U.S. Pat. No. 4,735,630 was developed. The patent discloses a manifold assembly using a single manifold assembly for each cell of a pile configured battery that employs a series obstacles of "bumps" in the flow path of the electrolyte in order to ensure a uniform flow of electrolyte through the cells of the battery. While this configuration helped to avoid the problematic results of non-uniform flow of electrolyte through battery cells discussed above, it did not address the compressive force issue discussed above or allowed the introduction of more than one independent fluid pathway into a cell.

Therefore, it is desired to provide a method and device for sealing manifolds independent of the applied compressive force necessary to reduce tolerancing of the manifold assembly, thus reducing unit cost. It is also desired to provide a manifold assembly that allows operation of a cell within pile configured batteries using independent flows of electrolyte.

SUMMARY OF THE INVENTION

The invention proposed herein comprises a manifold plate for use in pile configured batteries that produces a uniform flow of electrolyte through the cells of the batteries as well as provides a method of sealing the cells without application of unnecessary compressive force. The manifold plate of the present invention also provides for the use of independent fluid pathways for the electrolyte, allowing a user to use two independent electrolyte fluids if desired.

Accordingly, it is an object of this invention to provide a manifold for a pile configured battery that produces a uniform flow of electrolyte through the cells of the battery.

It is a further object of this invention to provide a manifold for a pile configured batter that reduces the horizontal compressive force on the manifold, so the compressive force focuses on the electrodes within the cells of the battery.

It is yet a further object of this invention to provide a manifold for a pile configured battery that provides two independent fluid pathway flows to the cells of the battery.

This invention meets these and other objectives related to improved pile configured batteries by providing a manifold plate for a pile configured battery having first and second side portions that have a center axis. The center axis basically divides the manifold into two identical sides configured in the same, but an opposite, manner. Each side comprises a fluid port to introduce and remove fluid from the battery and a fluid feed duct to direct fluid away from the center axis. Each side also includes a header section having a non-linear taper. The taper is configured so that the header inlet width is greater than the header termination. The header inlet width is also greater than the width of the fluid feed duct. Finally, each side also includes a plurality of lateral branches extending from the header section to feed fluid from the header section to the battery cell body and across the anode and cathode battery electrodes.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF PREFERRED EMBODIMENTS

The invention, as embodied herein, comprises an improved method of fabricating and discharging a pile configured battery which utilizes an electrically conductive flowing aqueous electrolyte. This is accomplished by use of a single piece hydraulic manifold plate which decouples the hydraulic performance parameters of the manifold from the electrical performance parameters. The manifold plate comprises a configuration of hydraulic feed channels and distribution headers which separately account for electrical resistive effects and fluid viscous and dynamic pressure effects. Implementation of such manifold plates allow for improved energy conversion efficiency as well as utilization of multiple dissimilar fluids in a single battery cartridge cell discharge at greatly reduced complexity and cost.

Many high rate, pile configured, batteries consist of over 200 cells electrically connected in series and hydraulically connected in parallel, mandating common electrolyte paths to the battery cells. Given the criteria that the electrolyte is common to each cell, the distribution of electrolyte into each battery cell is driven by two diametrically opposed requirements.

1. Maximize the electrical resistance of the hydraulic pathways in the electrolyte manifold system, thus minimizing the magnitude of the current flow through the electrolyte path for a given electrochemical cell driving potential.

2. Minimize the hydraulic resistance of the manifold electrolyte pathways to reduce the pressure drops across the manifold and the associated electrolyte pump power requirements.

Figure 1:
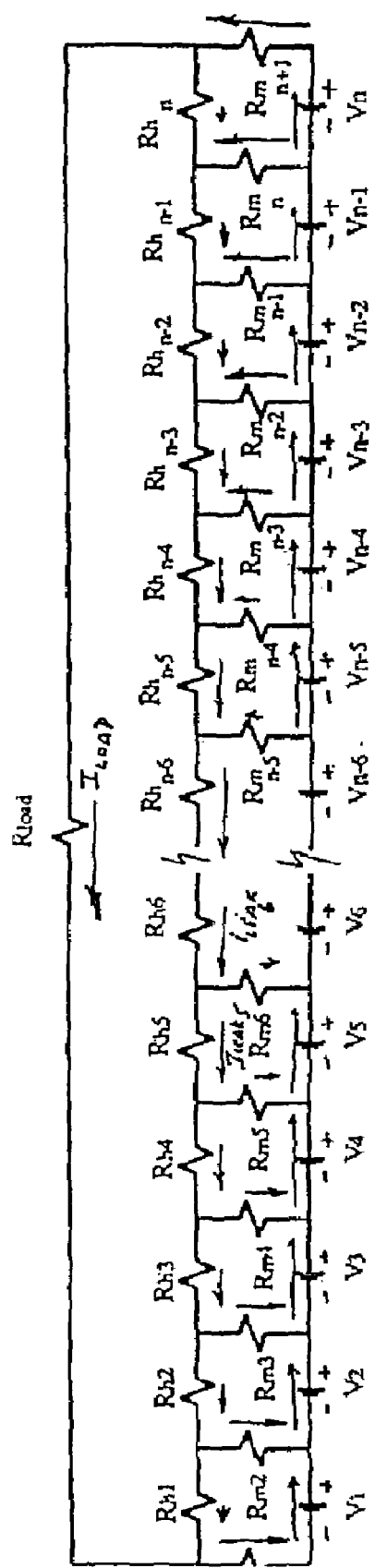
FIG. 1 is a simplified electrical circuit of a pile configured battery.

The first requirement is due to the fact that the individual cell voltages of the pile battery stack will drive electrical currents through the common electrolyte. These currents will not travel external to the battery and therefore will not be useful in terms of doing work. At the same time they will consume valuable electrode material and electrolyte reactants. This is evident in FIG. 1, which is a simplified electrical circuit representative of a prior art pile battery displaying the individual cell potentials, $V_n$, hydraulic path resistances, Rm, and the prime mover load resistance, Rload. The figure graphically displays the direction of the recirculating electrical currents, internal to the battery cartridge, in relation to the external load currents, Iload, for a simplified pile battery configuration.

The energy associated with the internal electrolyte path currents is not converted to useful work, but rather to heat, further adding to the thermal management requirement of the electrolyte. This problem becomes more obvious given the definition of electrical resistance, R, as it applies to any conductor, $$R = \rho_e L/A \quad (3)$$

Given the fact that the electrolyte electrical resistivity, $\rho_e$, as well as the battery cell driving potential, V, is fixed for this discussion, minimizing inner battery currents, I, is achieved by maximizing the electrolyte hydraulic path length, L, and minimizing the hydraulic path cross sectional area, A. In doing this, the pressure losses, ΔP, for a given electrolyte flow rate will be maximized based on the following relationship, $$\Delta P = \frac{1}{2} * \rho U^2 (1 + k + \pi/4 * D * fL/A) \quad (4)$$

contradictory to the second requirement mentioned above. The high pressure losses will result in maximum electrolyte pump power requirements, resulting in reduced overall system energy efficiency, n, defined as.

$$n = 100 * P_L / P_L + P_{leak} + P_{pump} \quad (5)$$

Where $P_L$ is the power dissipated through the prime mover load, thus achieving useful work, and $P_{leak}$ is the power dissipated internal to the cartridge manifold as a result of the leakage currents $P_{pump}$ is the hydraulic power associated with the cartridge manifold pressure drop for the predefined flow rate. These powers are calculated as, $$P_L = V_L I_L \quad (6)$$

$$P_{lea} = 1/N \int I^2_{leak} R dN \quad (7)$$

$$P_{pump} = Q_{pump} \Delta P / 2.2989 \quad (8)$$

Where the subscript L refers to the load value and the subscript leak refers to the leakage value, while N is the total number of cells in the cartridge stack $Q_{pump}$ is the electrolyte flow rate being pumped through the full battery cartridge in gallons per minute and the manifold static pressure drop, ΔP has units of psid. All units of power are in Watts.

To address the coupled nature of the manifold leakage current and pressure drop, the issue of uniform flow distribution into the cells, multiple electrolyte capability, and reduced sensitivity to tolerances, the present invention was developed.

In general, the present invention comprises a manifold plate for a pile configured battery having first and second side portions that have a center axis. The center axis basically divides the manifold into two identical sides configured in the same, but an opposite, manner. Each side comprises a fluid port to introduce and remove fluid from the battery and a fluid feed duct to direct fluid away from the center axis. Each side also includes a header section having a non-linear taper. The taper is configured so that the header inlet width is greater than the header termination. The header inlet width is also greater than the width of the fluid feed duct. Finally, each side also includes a plurality of lateral branches extending from the header section to feed fluid from the header section to the battery cell body and across the anode and cathode battery electrodes.

Figure 2:
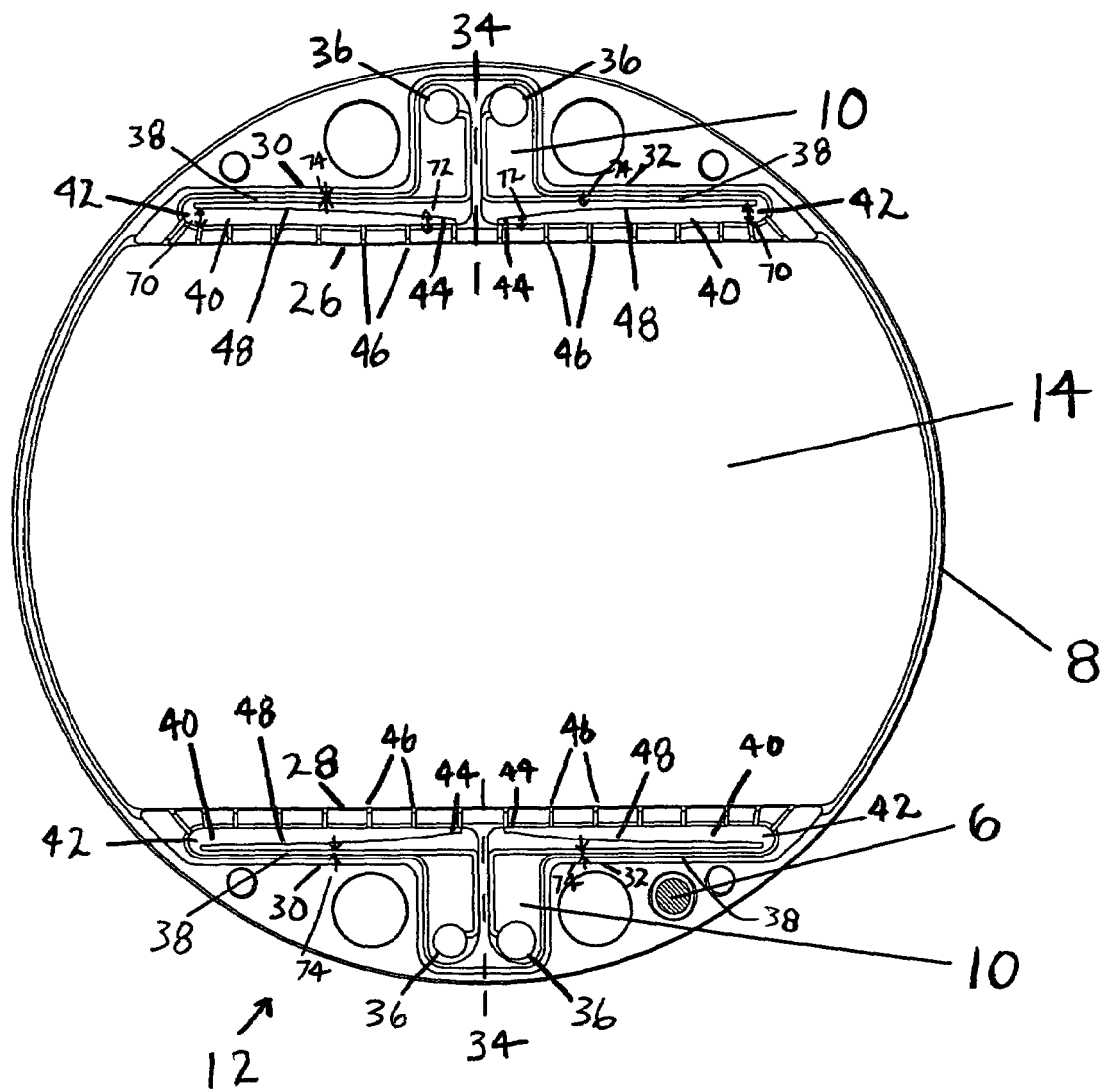
FIG. 2 is a cut-away view a pile configured battery employing the present invention.
Figure 3:
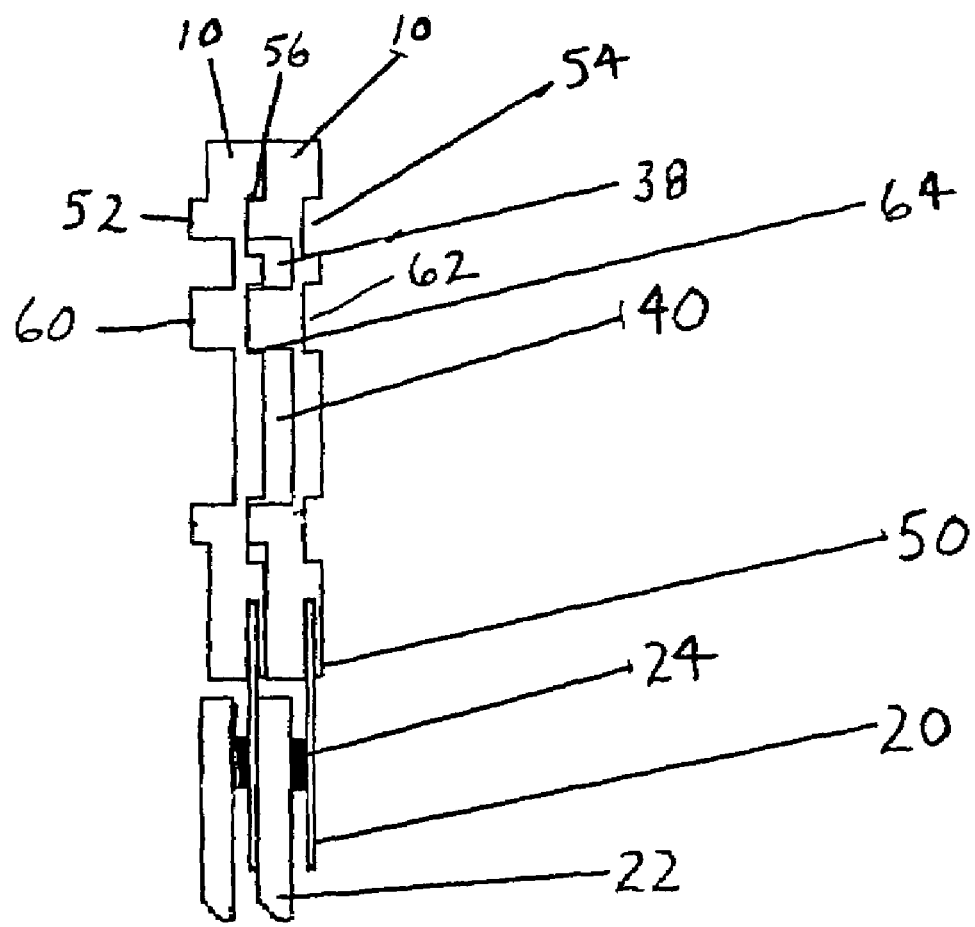
FIG. 3 is a cut-away side view of A-A from FIG. 2.

Referring to FIGS. 2 and 3, the present invention is a manifold plate 10 that is stacked along two opposite sides of a pile configured battery 12 within a cartridge shell 8. The manifold plates 10 are designed to hold stackable cells 14 that comprise anode and cathode electrodes 20, 22. The anode electrode 20 is separated within each cell from the cathode electrode 22 by spacer tabs 24. The top and bottom ends 26, 28 of each cell are held by the manifold plates 10. The battery 12 also includes an electrical conductor 6 on one of the manifold plates 10.

Each manifold plate 10 comprises first and second side portions 30, 32 that are separated by a center axis 34. The center axis 10 is not a physical element of the manifold plate 10, but represents the vertical center of the manifold plate 10 wherein the first and second side portions 30, 32 are physical mirror images of one another. The first and second side portions 30, 32 each have a fluid port 36 to introduce electrolyte into the battery 12 and remove electrolyte from the battery 12 as discussed further below. Each side portion 30, 32 also includes a fluid feed duct 38 that directs electrolytic fluid away from the center axis 34, a header section 40 that directs the fluid electrolyte back towards the center axis 34 and a plurality of lateral branches 46 that direct the fluid electrolyte into and out of each cell 14. The header section 40 is made up of a non-linear taper 48 from the header inlet 42 to the header termination 44 so that the width 70 of the header section 40 at the header inlet 42 is greater than the width 72 of the header section 40 at the header termination 44. The width 70 of the header section 40 at the header inlet 42 is also greater than the width 74 of fluid feed duct 38.

In a preferred embodiment, the manifold plate 10 also includes a recessed slot 50 wherein the anode electrode 20 is held. This slot 50 allows the anode electrode 50 to mechanically attach to the manifold plate 10 and also prevents the recessed portion of the anode electrode 50 from being contacted by the fluid electrolyte, thereby preventing corrosion. The depth of the recessed slot 50 may be selected by one skilled in the art.

In another embodiment, the manifold plate 10 includes a horizontal rib 52 extending from the manifold plate 10 on the front side above the fluid feed duct 38 and below the fluid port 36. A notch 54 is also placed opposite the horizontal rib 52 on the back side of the manifold plate 10. When the manifold plates 10 and cells 14 are stacked within the battery 12, a lateral interference seal 56 is formed between the top of the horizontal rib 52 one manifold plate 10 against the top of the notch 54 in a second manifold plate 10 directly in front of the first manifold plate 10. The lateral interference seal 56 isolates the electrolyte fluid of the fluid ports 36 of the first and second side portions 30, 32. The lateral interference seal 56 prevents mixing of the of the fluid electrolyte between the side portions 30, 32. This allows a user to use either unique electrolyte fluids within the side portions 30, 32 or provide for two unique pathways for the same electrolyte fluid into each cell.

In still another embodiment, the invention may also include a horizontal rib 60 extending from the manifold plate 10 on the front side below the fluid feed duct 38 and a notch 62 opposite the horizontal rib 60 on the back side of the manifold plate 10. A lateral interference seal 64 is formed between the bottom of the horizontal rib 60 of a first manifold plate 10 against the bottom of the notch 62 in a second manifold plate 10 in a stack of cells 14. The lateral interference seal 64 isolates the electrolyte fluid within the fluid feed duct 38 from fluid within the header section 40. Because this seal 64, as well as the seal 56 discussed above, are vertical compressions seals, this allows the anode and cathode electrodes 20, 22, along with their spacer tabs 24, to absorb almost all of the horizontal compression, making the battery significantly more efficient.

In operation, the invention operates to provide electrolytic fluid to the cells 14 of the battery 12 as follows. Either the same or different electrolytic fluids are introduced at the top of the manifold plate 10 via the fluid ports 36. The two fluids flow in the separate fluid feed ducts 38, which run symmetrical about the center axis 34. The fluid feed ducts 38 open into the header inlet 42, which is the entrance to the header sections 40. The header sections incorporate the nonlinear taper 48 in the axial direction of the header sections 40. The header sections 40 terminate at the header termination 44. A plurality of lateral branches 46 distribute the electrolytic fluid from the header sections 40 into the cell 14 body and across the electrodes 20, 22. The electrolytic fluid leave the cell 14 body through the opposite pathway across the bottom manifold plate 10.

The non linear taper 48 in the header section 40 provides a constant static pressure along the axial direction of the header section 40. This allows for a uniform discharge of electrolytic fluid through the lateral branches 46 and into the cell 14. By varying the taper 48 of the header section 40, the distribution of electrolyte into the cell 14 can be controlled, while having no resultant change in the overall pressure drop or leakage current of the manifold 10.

Figure 4:
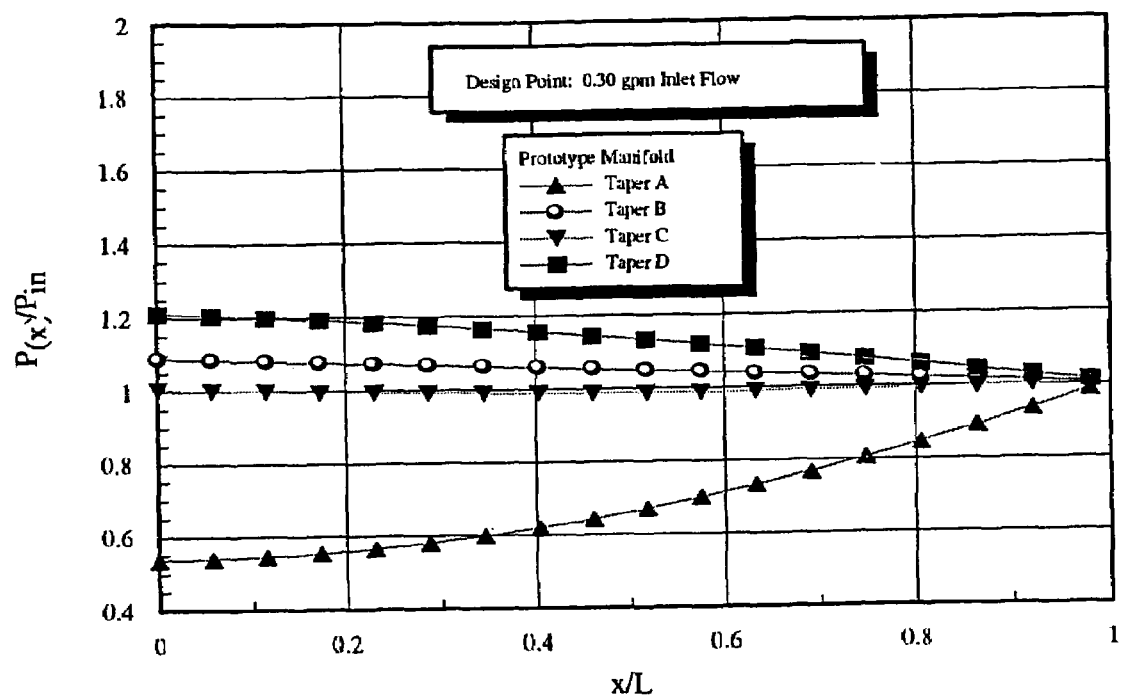
FIG. 4 is a graph showing variation in pressure of different embodiments of the present invention.

FIG. 4 shows the variation in pressure along the header section 40 axial length, P(x), normalized to the header inlet 42 pressure, Pin, where L is the overall header section 40 axial length. The pressure distribution can be tailored by varying the header inlet width 70 and corresponding taper 48 to account for viscous and dynamic effects.

Figure 5:
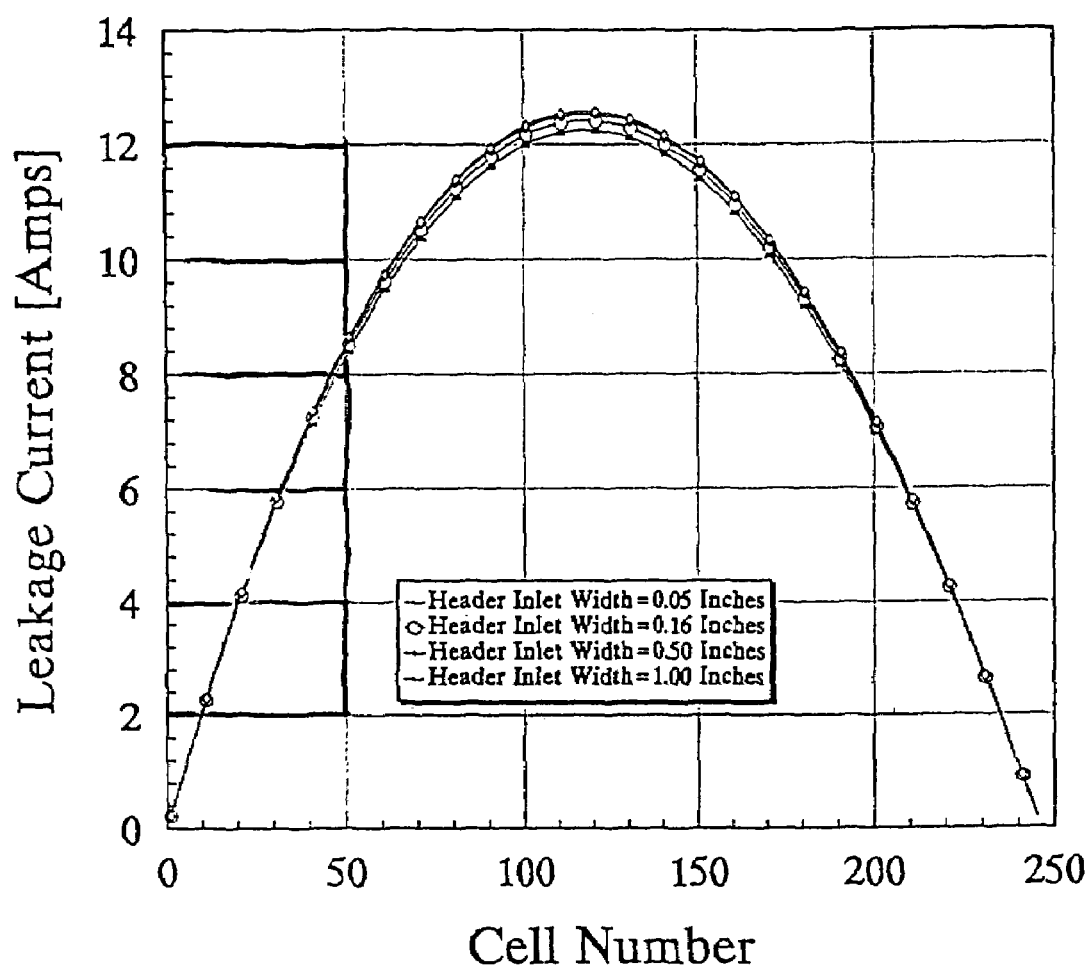
FIG. 5 is a graph showing leakage through the circuit as it varies with header geometry of the present invention.

While varying the header section 40 geometry and, thus, the hydraulic distribution into the cell 14, there is effectively no variation in the leakage current through the manifold as shown in FIG. 5, which is a graphical representation of a 250 cell pile battery cartridge utilizing the present invention with various header inlet 42 and taper 48 geometry's.

Figure 6:
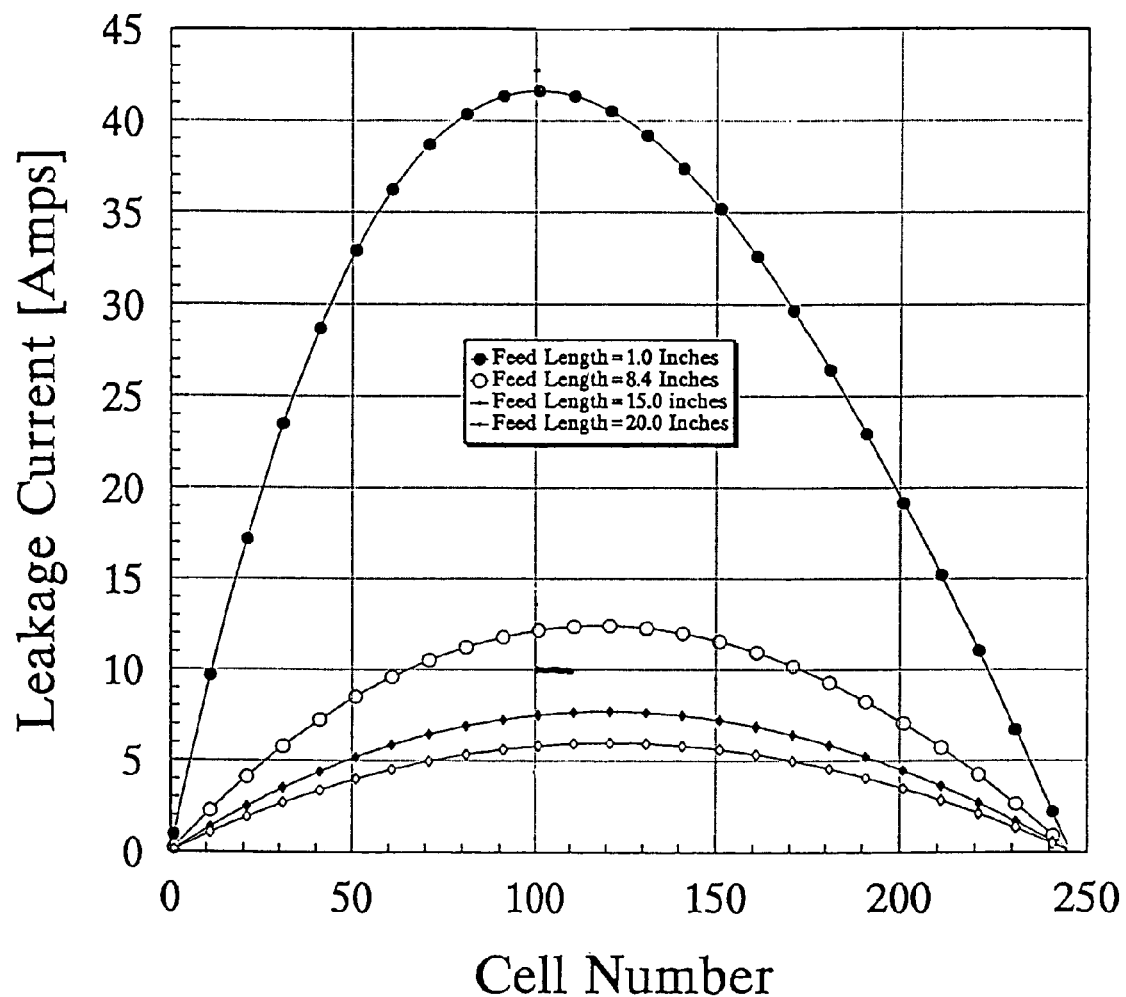
FIG. 6 is a graph showing leakage through the circuit as it varies with feed channel geometry of the present invention.

As shown in FIG. 6, while varying the length of the fluid feed duct 38, which feeds the manifold header section 40, there is a significant variation in the leakage current through the manifold 10 and, subsequently, throughout the cartridge 8. The variation of the length of the feed duct 38, while dramatically impacting leakage currents, will not impact the hydraulic distribution of the manifold header section 40. Thus the hydraulic performance of the manifold header 40 is independent of the control of the manifold leakage currents.

The present invention may be constructed via injection molding techniques, based on the requirements of dimensional precision from part to part and cost reduction. The invention may also be machined from stock materials, manufactured by Stereo Lithography using UV activated epoxy or by blow molding processes. The preferred material for construction of the invention are thermoplastics due to the requirements for high temperature operation and dimensional stability during operation. However, low temperature applications would allow the use of a full spectrum of materials such as Polypropylene, Polyethylene, Epoxy, Polyester, Nylon, TFE, and PTFE.

Therefore, the present invention, as described herein, provides the following advantages over those manifolds currently employed in pile battery manufacture.

1. The invention provides an improved method to uniformly distribute, on a mass flow basis, a conductive electrolyte to each and through each cell of a pile configured battery cartridge cell stack:

a. By use of specific manifold headers and header tapers in the header axial direction to account for viscous and dynamic fluid effects, thereby, providing a zero pressure gradient across the width of the anode inlet. This assures uniform mass flow into the cell and across the electrode surface.

b. By use of parallel flow paths along with symmetrical header alignment resulting in symmetrical inner cell fluid flow distribution.

c. By use of perimeter hydraulic seals integral to the manifold assembly which provide a hydraulic seal independent of the compressive force applied to the manifold assembly reducing the necessity of tight tolerances in actual manufacturing applications and, thus, reducing tooling complexity and part rejection and reducing overall costs.

d. By use of symmetrical, hydraulically parallel, feed channels and distribution headers for redundant flow paths, thus improving reliability.

2. The invention provides a method of controlling and reducing the inefficient intercell shunt currents traveling through the manifolds conductive electrolyte pathway, independent of the hydraulic flow distribution, into a particular cell. The ability to decouple the hydraulic performance of the manifold from the electrical performance of the manifold reduces the cost and complexity of designing a manifold assembly for a given application as well as reduces the need to compromise the performance of the hydraulics for the sake of reduced shunt current performance.

3. The invention provides a method to distribute different fluids into a single battery electrochemical cell cavity while maintaining the isolation of one fluid from the other, thus, preventing the chemical reaction of these fluids with each other prior to their use in the electrochemical cell.

4. The present invention provides a method to mechanically fasten the manifold onto the electrode which assures accurate alignment of the manifold relative to the electrode while simultaneously masking off both sides of the non conducting surface of the electrode which interlocks into the manifold.

What is described are specific examples of many possible variations on the same invention and are not intended in a limiting sense. The claimed invention can be practiced using other variations not specifically described above.

What is claimed is:

1. A manifold plate for a battery, the battery having stackable cells each with top and bottom ends, each cell having anode and cathode electrodes separated by spacer tabs, the top and bottom ends each attached to a manifold plate, comprising:

first and second side portions, having a center axis, each comprising:

a fluid port to introduce fluid into the battery and remove fluid from the battery;

a fluid feed duct, having a first width, to direct fluid away from the center axis;

a header section, having a non-linear taper wherein a header inlet comprises a second width greater than the first width and greater than a third width of a header termination, receiving fluid from the fluid feed duct and directing the fluid back toward the center axis; and a plurality of lateral branches extending from the header section to feed fluid from the header section to a battery cell body and across anode and cathode battery electrodes.

2. The manifold plate of claim 1, further comprising a recessed slot at a bottom end of the manifold plate, a portion of the anode electrode inserted therein wherein the fluid cannot contact the portion.

3. The manifold plate of claim 1, further comprising:
a horizontal rib extending from the manifold plate on a front side above the fluid feed duct; and,
a notch opposite the horizontal rib on a back side of the manifold plate wherein a lateral interference seal is formed between a top of the horizontal rib of a first manifold plate against a top of the notch in a second manifold plate directly in front of the first manifold plate in a stack of cells wherein the lateral interference seal isolates fluid within the fluid ports of the first and second side portions.

4. The manifold plate of claim 1, further comprising:
a horizontal rib extending from the manifold plate on a front side below the fluid feed duct; and
a notch opposite the horizontal rib on a back side of the manifold plate wherein a lateral interference seal is formed between a bottom of the horizontal rib of a first manifold plate against a bottom of the notch in a second manifold plate directly in front of the first manifold plate in a stack of cells wherein the lateral interference seal isolates fluid within the fluid feed duct from fluid within the header section.

5. A manifold plate for a battery, the battery having stackable cells each with top and bottom ends, each cell having anode and cathode electrodes separated by spacer tabs, the top and bottom ends each attached to a manifold plate, comprising:
first and second side portions, having a center axis, each comprising:
a fluid port to introduce and remove fluid from the battery;
a fluid feed duct, having a first width, to direct fluid away from the center axis;
a header section, having a non-linear taper wherein a header inlet comprises a second width greater than the first width and greater than a third width of a header termination, receiving fluid from the fluid feed duct and directing the fluid back toward the center axis;
a plurality of lateral branches extending from the header section to feed fluid from the header section to a battery cell body and across anode and cathode battery electrodes;
a recessed slot at a bottom end of the manifold plate, a portion of the anode electrode inserted therein wherein the fluid cannot contact the portion;
a first lateral interference seal formed by:
a horizontal rib extending from the manifold plate on a front side above the fluid feed duct;
a notch opposite the horizontal rib on a back side of the manifold plate wherein the lateral interference seal is formed between a bottom of the horizontal rib of a first manifold plate against a bottom of the notch in a second manifold plate directly in front of the first manifold plate in a stack of cells wherein the lateral interference seal isolates fluid within the fluid ports of the first and second side portions a second lateral interference seal formed by:
a second horizontal rib extending from the manifold plate on a front side below the fluid feed duct;
a second notch opposite the second horizontal rib on a back side of the manifold plate wherein the lateral interference seal is formed between a bottom of the second horizontal rib of the first manifold plate against a bottom of the second notch in the second manifold plate directly in front of the first manifold plate in a stack of cells wherein the lateral interference seal isolates fluid within the fluid feed duct from fluid within the header section.

6. A process to provide electrolyte to the cells of a battery having stackable cells each with top and bottom ends, each cell having anode and cathode electrodes separated by spacer tabs, comprising the steps of:
providing first and second manifolds for each cell, the top end attached to the first manifold and the bottom end attached to the second manifold, the first and second manifolds comprising first and second side portions, having a center axis, each comprising a fluid port to introduce and remove fluid from the battery, a fluid feed duct, having a first width, to direct fluid away from the center axis, a header section, having a non-linear taper wherein a header inlet comprises a second width greater than the first width and greater than a third width of a header termination, receiving fluid from the fluid feed duct and directing the fluid back toward the center axis, and, a plurality of lateral branches extending from the header section to feed fluid from the header section to a battery cell body and across anode and cathode battery electrodes; and
introducing a first fluid into the first side portion fluid port and a second fluid into the second side portion fluid port.

7. The process of claim 6, wherein the first and second fluids comprise the same fluid.

8. The process of claim 7, wherein the first and second manifolds further comprise a recessed slot at a bottom end of the manifold plates, a portion of the anode electrode inserted therein wherein the fluid cannot contact the portion.

9. The process of claim 7, wherein the first and second manifolds further comprise a horizontal rib extending from the manifold plates on a front side above the fluid feed duct, and a notch opposite the horizontal rib on a back side of the manifold plate wherein a lateral interference seal is formed between a top of the horizontal rib of a rear manifold plate against a top of the notch in a front manifold plate directly in front of the rear manifold plate in a stack of cells wherein the lateral interference seal isolates fluid within the fluid ports of the first and second side portions.

10. The process of claim 7, wherein the first and second manifolds further comprise a horizontal rib extending from the manifold plates on a front side below the fluid feed duct, and, a notch opposite the horizontal rib on a back side of the manifold plates wherein a lateral interference seal is formed between a bottom of the horizontal rib of a rear manifold plate against a bottom of the notch in a front manifold plate directly in front of the rear manifold plate in a stack of cells wherein the lateral interference seal isolates fluid within the fluid feed duct from fluid within the header section.

* * * * *